(12) United States Patent
Tanaka

(10) Patent No.: US 6,339,511 B1
(45) Date of Patent: Jan. 15, 2002

(54) LENS ACTUATOR AND OPTICAL DISK RECORDING AND READING APPARATUS USING THE SAME

(75) Inventor: Akihiro Tanaka, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/595,895

(22) Filed: Jun. 20, 2000

(30) Foreign Application Priority Data

Jul. 2, 1999 (JP) .............................................. 11-188536

(51) Int. Cl.[7] .............................. G02B 7/02; G11B 17/00
(52) U.S. Cl. ........................ 359/813; 359/823; 359/824; 369/247
(58) Field of Search .................................. 359/813, 814, 359/823, 822, 824; 369/247, 248, 44.14, 44.15, 44.16

(56) References Cited

U.S. PATENT DOCUMENTS 5,926,327 A * 7/1999 Bae .............................. 359/824
6,259,671 B1 * 7/2001 Shibusaka ..................... 396/247

FOREIGN PATENT DOCUMENTS

JP    09-190636    7/1997

* cited by examiner

Primary Examiner—Georgia Epps
Assistant Examiner—Saeed Seyrafi
(74) Attorney, Agent, or Firm—Dickstein Shapiro Morin & Oshinksky LLP

(57) ABSTRACT

A lens actuator for use in an optical disk recording and reading apparatus includes a moving member and a mass balancing member. The moving member includes a holder for holding an object lens movably in tracking and focus directions, a driving coil for generating a thrust for driving the holder in the tracking and focus directions, and a set of supporting members for supporting the holder and supplying power to the driving coil. The mass balancing member is positioned diagonal to the object lens held on the moving member by the holder and is configured to make contact with the driving coil within the moving member.

11 Claims, 5 Drawing Sheets

LENS ACTUATOR AND OPTICAL DISK RECORDING AND READING APPARATUS USING THE SAME

CROSS-REFERENCE TO RELATED APPLICATIONS

This application claims priority to Japanese patent application No. JPAP11-188536 filed on Jul. 2, 1999, the entire contents of which are hereby incorporated by reference.

BACKGROUND

1. Field

The present invention relates to an optical disk recording and reading apparatus, and more particularly to a lens actuator for optically recording and reading data on a disk.

2. Description of the Related Arts

A lens actuator for use in an optical disk recording and reading apparatus is required to employ a movable supporting member capable of reducing as much lost motion as possible, caused by a non-lineality factor of a lens actuator motion. For this reason, a set of linear-shaped springs for supporting the movable supporting member has been employed in a lens actuator needed to be controlled with a high degree of precision. Japanese Laid-Open Patent Publication No. 09-190636 (1997) is one example, describing a structure of an object lens holder. In this structure, the holder is configured to surround a driving coil generating a thrust for moving the holder in focus and tracking directions.

An optical disk recording and reading apparatus employing the above-mentioned lens actuator needs to be low profiled especially when it is used in a note-book type personal computer, for example. This is, of course, because the note-book type personal computer requires thinner components than desktop type personal computers do due to portability requirements of the note-book type personal computer. On the other hand, since a high speed trackability becomes more important for a lens actuator with increases of recording density and of an operating speed of a system, the lens actuator needs to be improved in a frequency response particularly during the time when an object lens is moved for the focusing and tracking operations. In particular, the driving coil is needed to improved to have a high sensitivity, and a high natural oscillation frequency in a rigid mode and a high natural oscillation frequency of a movable supporting structure in an elastic deformation mode.

In order to meet the above-mentioned requirements, an optimum designing is needed under consideration of reductions in size and weight and provision of greater rigidity. More specifically, the lens holder is needed to be designed to have an optimum shape. Also, for such a lens holder, it is worth to consider use of a sophisticated plastic resin having a high rigidity ratio, a high ratio of an elastic coefficient to a mass density. Further, it becomes more important to consider a measure for improving reliability of heatsink relative to a self-produced heat depending upon a power consumed by the driving coil. This is due to a necessity of high speed trackability compatible to various types of recording and reading medium sold in the market.

However, in the structure described in the above reference, the driving coil produces an inferior heatsink effect since the holder surrounds the driving coil for the purpose of improving rigidity. In general, making a component compact and lighter will lead a deterioration of heatsink and allow a smaller amount of current flow due to the heat problem. Therefore, in this case, either one of a high speed and a reliability is normally sacrificed.

On the other hand, an effect from a resonance produced in a rigid mode can be reduced by a method of matching a center of measurement which is a principal point of a lens as and three centers in a movable supporting structure which are a thrust center, an inertia center, and an elastic (supporting) center. This method is known by a principle of Abbe and a principle of alignment. According to it, various kinds of movable supporting structure have been developed for the lens actuator. However, dimensions around the lens is extremely severe and the position of the lens needs to be arranged in an offset position because of the requirements for thinning the structure of the optical disk recording and reading apparatus. With this structure arranging an offset position, it is difficult to eliminate the inertial linear moment and to match the inertial center to other centers of thrust, elastic, and so on. To measure this problem, a metal material having a relatively high mass density is used as a mass adjusting member. However, such a metal material increases manufacturing cost and the weight of apparatus, which reverses the above-mentioned recent requirements.

SUMMARY

The present invention provides a novel lens actuator for use in an optical disk recording and reading apparatus. In one example, a novel lens actuator includes a moving member and a mass balancing member. The moving member includes a holder for holding an object lens movably in tracking and focus directions, a driving coil for generating a thrust for driving the holder in the tracking and focus directions, and a set of supporting members for supporting the holder and supplying power to the driving coil. The mass balancing member is positioned diagonal to the object lens held on the moving member by the holder and is configured to make contact with the driving coil within the moving member.

The mass balancing member may be made of metal.

The mass balancing member may have a portion protruding from the holder. In this case, the portion is arranged in a space formed in a base of the lens actuator without contacting the base, wherein the space is filled with a viscoelastic dumber material.

The holder may be configured to allow portions of the driving coil to be out of the holder and exposed to air, wherein the portion of the driving coil includes a magnet-effective portion and coil surfaces excluding a surface at which the driving coil is mounted on the mass balancing member.

The set of supporting members may be made of lineally-elastic material which elastically deforms in accordance with a thrust generated by the driving coil.

The present invention further provides an optical disk recording and reading apparatus which includes one of the above-mentioned lens actuator, wherein the object lens is to gather laser light on an optical disk.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein.

DETAILED DESCRIPTION

Figure 1:
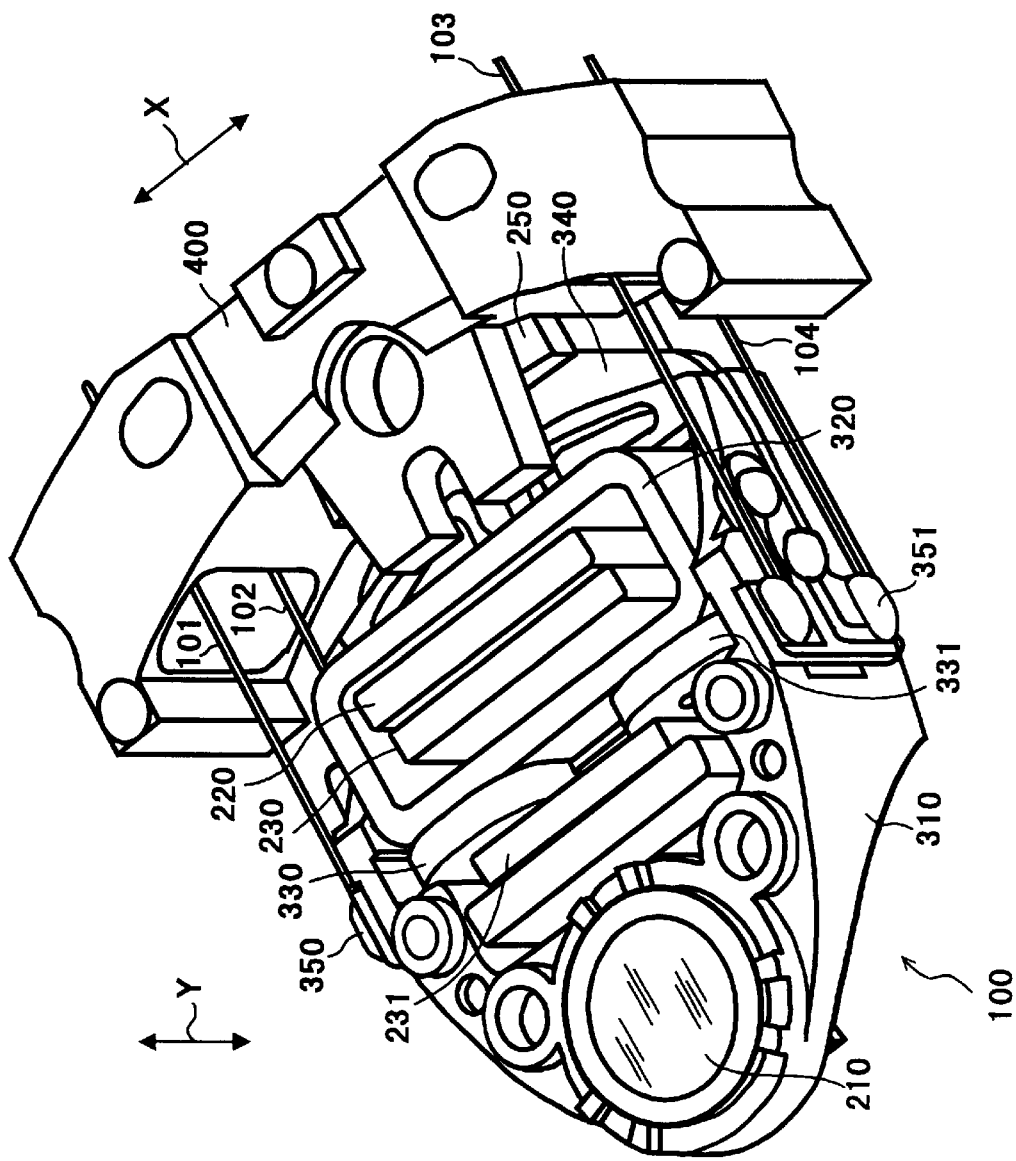
FIG. 1 is an upper perspective view of a lens actuator according to an embodiment of the present invention.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Referring now to the drawings, wherein like reference numerals designate identical or corresponding parts throughout the several views, particularly to FIG. 1, there is illustrated a lens actuator for an optical disk recording and reading apparatus. As illustrated in FIG. 1, the lens actuator for an optical disk recording and reading apparatus includes a moving member 100 that includes a holder 310, a focus coil 320, trick coils 330 and 331, supporting members 101, 102, 103, and 104, printed-circuit boards (PCBs) 350 and 351, and a mass balancer 340. The holder 310 holds an object lens 210 and is configured to move in a tracking direction X (the vertical direction in the drawing) indicated by arrows, and a focus direction Y (the horizontal direction in the drawing) indicated by arrows. The focus coil 320 is capable of generating a thrust for moving the holder 310 in the focus direction Y and the tracking coils 330 and 331 are capable of generating a thrust for moving the holder 310 in the tracking direction X. The supporting members 101, 102, 103, and 104 hold the holder 310 and supply power to the focus coil 320 and the tracking coils 330 and 331. The PCBs 350 and 351 are used for supplying power to the focus coil 320 and the tracking coils 330 and 331. The mass balancer 340 is used as a metallic material for adjusting the weight balance of the lens actuator of FIG. 1.

The above-mentioned lens actuator is mounted in an optical recording and reading apparatus (not shown) such that the object lens 210 has the optical axis approximately normal to the disk plane of the optical disk (not shown) so as to have the laser light converged to read information written on the optical disk and to write information onto the optical disk.

The supporting members 101–104 are made of lineally elastic material that can have an elastic displacement in accordance with a thrust generated by the focus coil 320 and the tracking coils 330 and 331. The supporting members 101–104 have one end mounted on a base of the optical disk recording and reading apparatus. The supporting members 101 and 102 have another end mounted on the PCB 350 and the supporting members 103 and 104 have another end mounted on the PCB 351. Thereby, the supporting members 101–104 movably support the moving member 100 which elastically moves in the tracking direction X and the focus direction Y.

In FIG. 1, numeral reference 220 denotes a rear yoke and each of numeral reference 230 and 231 denotes a magnet. These magnets 230 and 231 and the yoke 220 make up a fixed magnetic circuit (not shown) and are mounted on a base (not shown). The rear yoke 220 and the magnets 230 are inserted into the focus coil 320, as illustrated in FIG. 1. The magnet 231 is inserted into the holder 310 positioned opposite to the focus coil 320 having the tracking coils 330 and 331.

Figure 2:
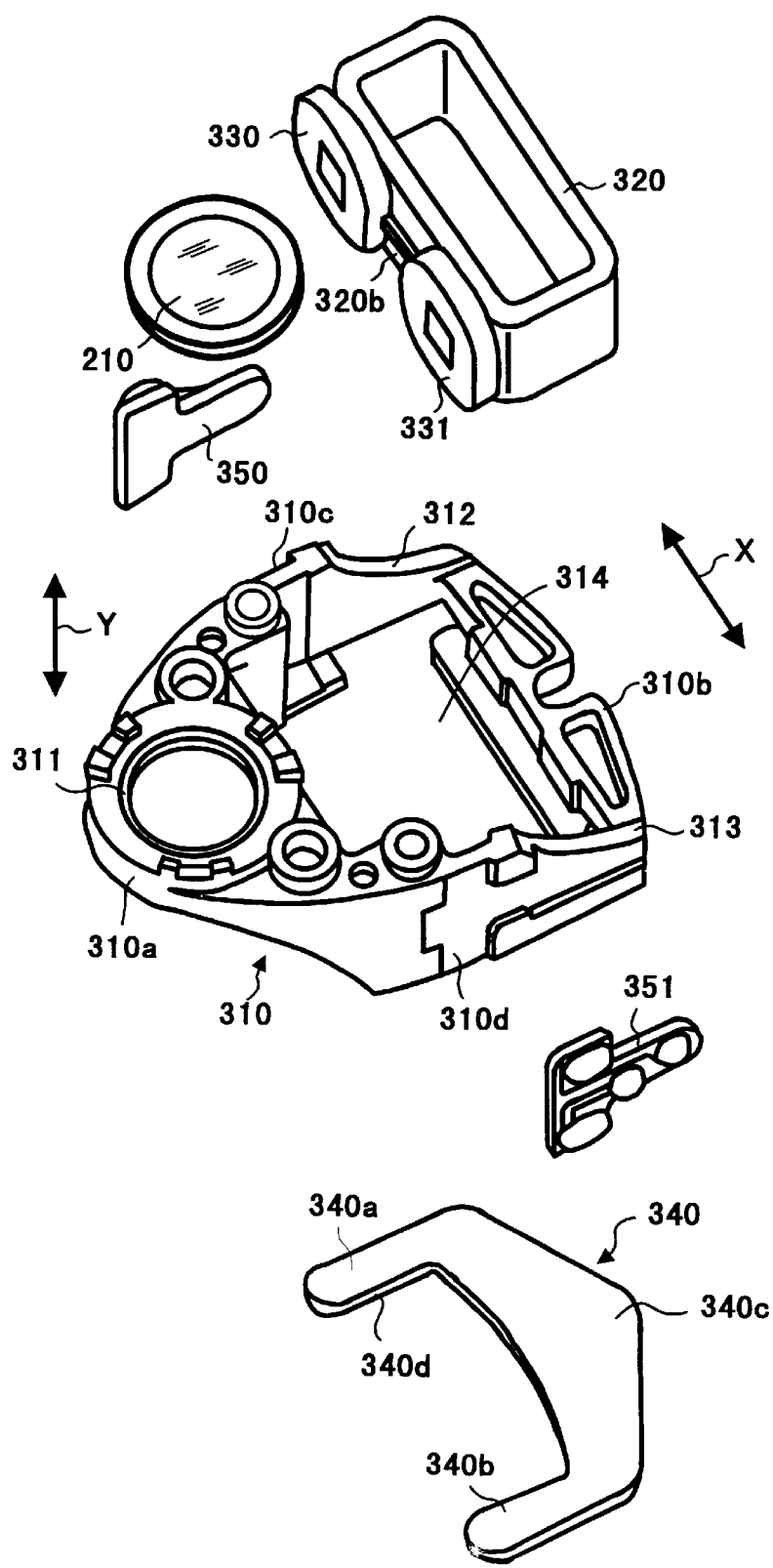
FIG. 2 is an upper perspective exploded view of a main portion of the lens actuator of FIG. 1.

As illustrated in FIG. 2 showing a view of the moving member 100 from an upper slanting direction, the holder 310 has a front side 310a which forms a lens holder 311 and an opening 314 for receiving at its central area the driving coils including the focus coil 320 and the tracking coils 330 and 331. The holder 310 also forms, at its rear base side 310b positioned diagonal to the object lens 210, a mass balance mounting portion 318 (FIG. 3) for mounting the mass balancer 340.

Figure 3:
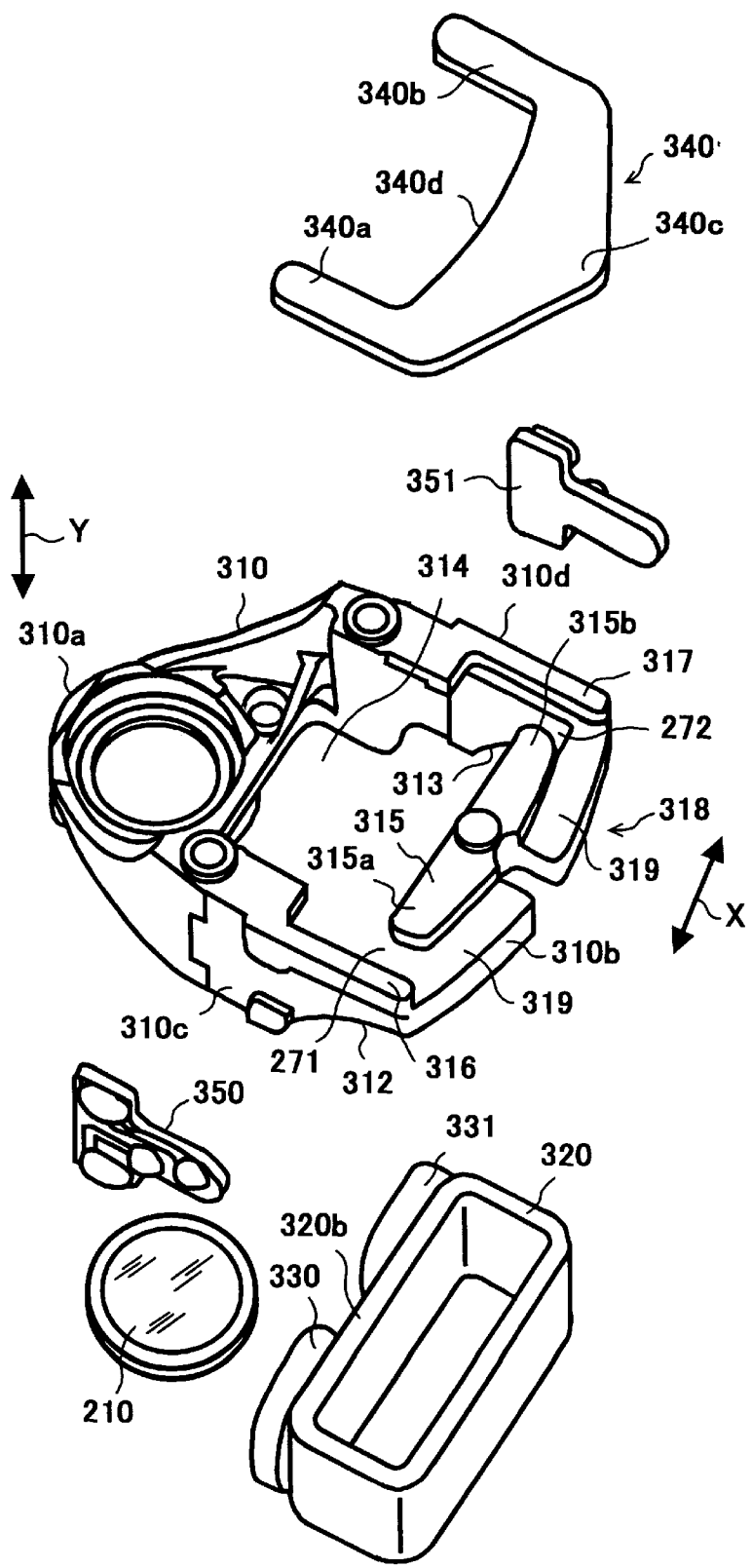
FIG. 3 is a bottom perspective exploded view of the main portion of the lens actuator of FIG. 1.

As illustrated in FIG. 3 showing a view of the moving member 100 from a bottom slanting direction, the mass balance mounting portion 318 includes a bonding surface 319, a stopper 315, and openings 271 and 272. The bonding surface 319 is provided at a rear side of the holder 310. The stopper 315 is configured to protrude from the plane of the upper surface of the bonding surface 319. The opening 271 is formed between an end 315a of the stopper 315 and a side wall 310c of the holder 310. The opening 272 is formed between an end 315b of the stopper 315 and a side wall 310d of the holder 310.

The holder 310 is formed to allow the focus coil 320 to expose its coil effective surfaces other than a surface at which the mass balancer 340 is mounted. In this example, each of upper rear surface 312 of the side wall 310c and upper rear surface 313 of the side wall 310d, neighboring on the focus coil 320, has a slope which has the lowest portion at the connection to the rear base side 310b. The reason for this is that the focus coil 320 generates the thrust particularly at a side 320b thereof at which the tracking coils 330 and 331 are mounted and that the holder 310 does not require a wall structure at the upper rear side thereof for the reasons of an inertial force and a stiffness. In this way, the holder 310 is reduced in weight without causing a negative effect to the structural strength.

The mass balancer 340 is used to adjust the center of the inertia of the moving member 100, and is made of a plate having arms 340a and 340b and a well 340d sandwiched between these arms 340a and 340b and having a contour similar to that of the stopper 315, as illustrated in FIGS. 2 and 3. The arms 340a and 340b have a width slightly smaller than that of the openings 271 and 272, respectively, and can be inserted into the openings 271 and 272. Thus, when the mass balancer 340 is mounted on the mass balance mounting portion 318, the arms 340a and 340b are positioned in the opening 314. The mass balancer 340 includes a protruding portion 340c which protrudes outside from the rear base side 310b at a place positioned opposite to the well 340d when the mass balancer 340 is mounted on the mass balance mounting portion 318.

Figure 4:
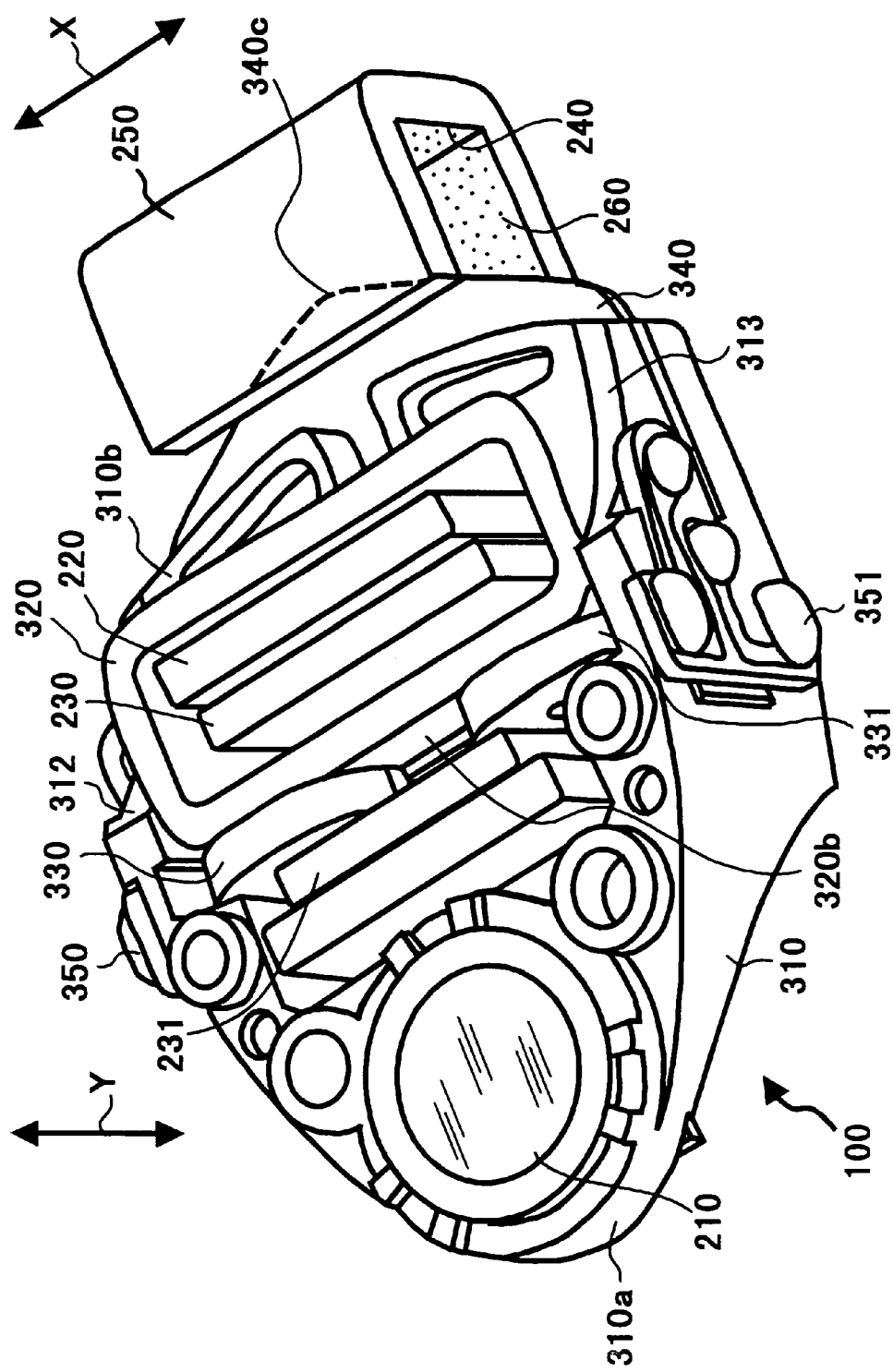
FIG. 4 is an upper perspective view of the main portion of the lens actuator of FIG. 1.
Figure 5:
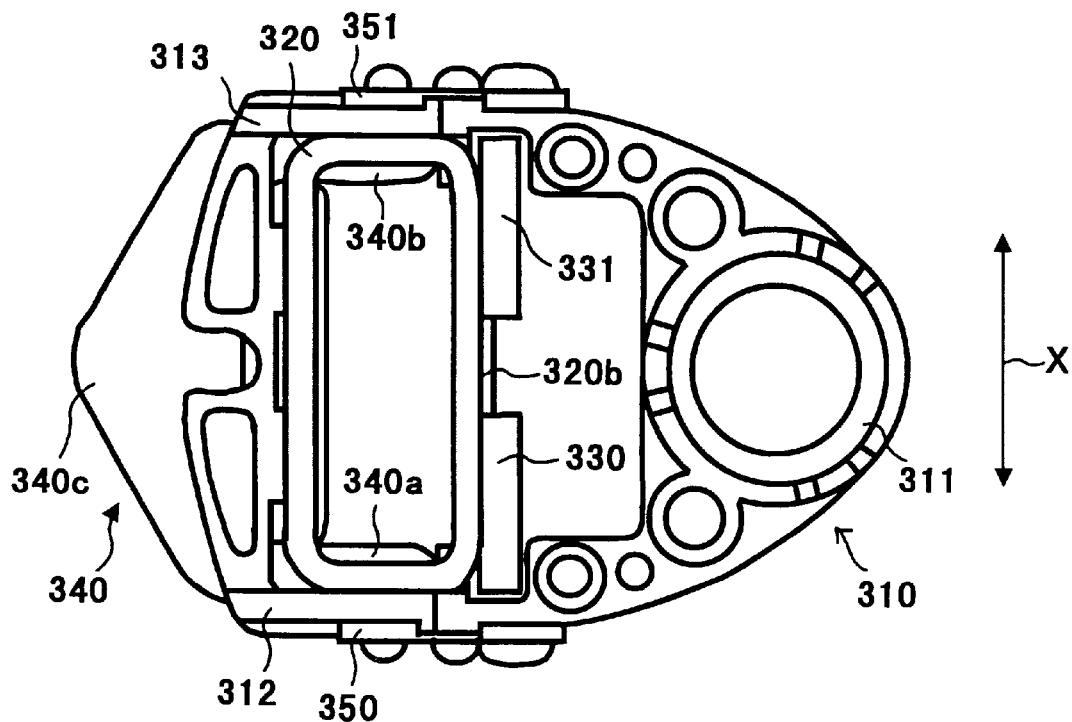
FIG. 5 is a top view of the main portion of the lens actuator of FIG. 1.
Figure 6:
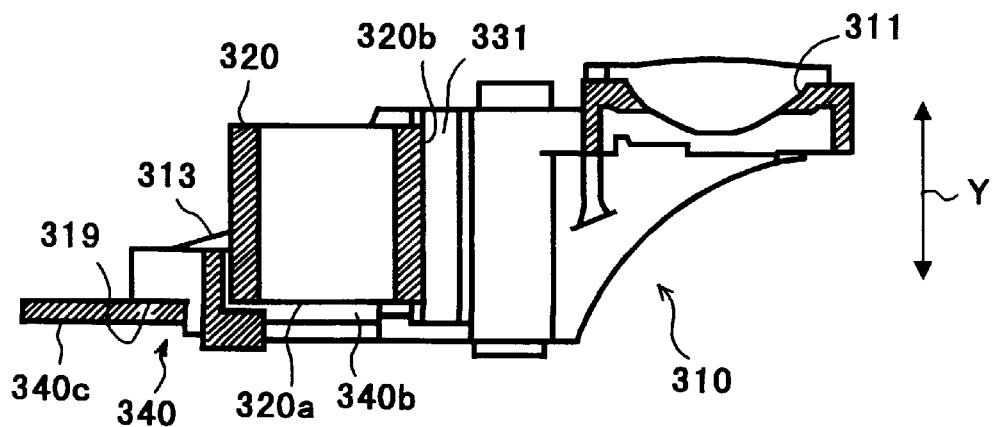
FIG. 6 is a side section view of the main portion of the lens actuator of FIG. 1.

The mass balancer 340 is inserted into the openings 271 and 272, positioned inside of bottom surfaces 316 and 317 formed opposite sides of the upper rear surfaces 312 and 313, respectively, from the rear base side 310b of the holder 310 to the front side 310a. After such an insertion, the mass balancer 340 is fixed to the bonding surface 319 of the mass balance mounting portion 318 with an adhesive agent or by melting. Thus, the mass balancer 340 is mounted on the mass balance mounting portion 318. That is, the mass balancer 340 is mounted on the rear base side 310b positioned diagonal to the object lens 210 located on the moving member 100, as illustrated in FIG. 4. Also, the arms 340a and 340b of the mass balancer 340 are fixed to a bottom side 320a of the focus coil 320 within the holder 310, as illustrated in FIGS. 5 and 6. Thus, the mass balancer 340 is fixed to the holder 310 and, as a total configuration, the moving member 100 is in balance in terms of inertia.

The protruding portion 340c of the mass balancer 340 mounted on the holder 310 is held in a space 240 formed in a U-like-shaped member 250 without contacting an inside surface of the U-like-shaped member 250, as illustrated in FIG. 4. Even when the moving member 100 moves for the maximum distance in the tracking direction X and in the focus direction Y, the inside surface of the U-like-shaped member 250 is kept no contact with the protruding portion 340c. The space 240 is filled with a viscoelastic dumper agent 260 so that the protruding portion 340c is held in a floating condition within the space 240. The dumper agent 260 is a silicon gel, for example. The U-like-shaped member 250 is fixed, for example, to a actuator base 400 which serves as a base for the lens actuator, as illustrated in FIG. 1

With the above-described configuration, it becomes possible to first fix one of the mass balancer 340 and the focus coil 320 to the holder 310, so that the position of the other can automatically be determined. For example, the mass balancer 340 is fixed to the holder 310 previously during the manufacturing process of the holder 310 using an insertion molding method or the like.

In the thus-configured lens actuator, the focus coil 320 on the moving member 100 is fixed in contact to the mass balancer 340 and will therefore be subjected to a superior heatsink effect, wherein the heat is produced by the focus coil 320 itself and depends on the power consumed by the focus coil 320. Further, the rigid motion of the mass balancer 340 can effectively be reduced and the heatsink effect can accordingly be improved by making the heatsink-effect mass balancer 340 in contact with the space 240 via the viscoelastic dumper material 260. Also, as described above, the holder 310 is reduced in weight by removing the above-described portion which removal does not have a negative effect in terms of the structural strength, the holder 310 therefore has a relatively low height at such portion and the heatsink effect relative to the focus coil 320 itself can be improved. In this way, the above-described configuration can achieve both an efficient heatsink effect and the weight reduction with maintaining the structural strength.

Although the yoke 220, the magnets 230 and 231, forming the magnetic circuit, and the space 240 are independent from the lens actuator structure in the above-described example, these components may be made in one piece integrated with the actuator base 400 of FIG. 1.

Numerous additional modifications and variations of the present application are possible in light of the above teachings. It is therefore to be understood that within the scope of the appended claims, the present application may be practiced otherwise than as specifically described herein.

I claim:

1. A lens actuator, comprising:
   a moving member comprising:
      a holder for holding an object lens movably in tracking and focus directions;
      a driving coil for generating a thrust for driving said holder in the tracking and focus directions; and
      a set of supporting members for supporting said holder and supplying power to said driving coil, and
   a mass balancing member positioned diagonal to said object lens held on said moving member by said holder, said mass balancing member being configured to make contact with said driving coil within said moving member.

2. The lens actuator as defined in claim 1, wherein said mass balancing member is made of metal.

3. The lens actuator as defined in claim 1, wherein said mass balancing member has a portion protruding from said holder and said portion is arranged in a space formed in a base of said lens actuator without contacting said base, said space being filled with a viscoelastic dumber material.

4. The lens actuator as defined in claim 1, wherein said holder is configured to allow portions of said driving coil to be out of said holder and exposed to air, said portion of said driving coil including a magnet-effective portion and coil surfaces excluding a surface at which said driving coil is mounted on said mass balancing member.

5. The lens actuator as defined in claim 1, wherein said set of supporting members are made of lineally-elastic material which elastically deforms in accordance with a thrust generated by said driving coil.

6. A lens actuator, comprising:
   moving member means comprising:
      holding means for holding an object lens movably in tracking and focus directions;
      a driving coil for generating a thrust for driving said holding means in the tracking and focus directions; and
      a set of supporting member means for supporting said holding means and supplying power to said driving coil, and
   mass balancing member means positioned diagonal to said object lens held on said moving member means by said holding means, said mass balancing member means being configured to make contact with said driving coil within said moving member means.

7. The lens actuator as defined in claim 6, wherein said mass balancing member means is made of metal.

8. The lens actuator as defined in claim 7, wherein said mass balancing member means has a portion protruding from said holding means and said portion is arranged in a space formed in a base of said lens actuator without contacting said base, said space being filled with a viscoelastic dumber material.

9. The lens actuator as defined in claim 6, wherein said holding means is configured to allow portions of said driving coil to be out of said holding means and exposed to air, said portion of said driving coil including a magnet-effective portion and coil surfaces excluding a surface at which said driving coil is mounted on said mass balancing member means.

10. The lens actuator as defined in claim 6, wherein said set of supporting member means are made of lineally-elastic material which elastically deforms in accordance with a thrust generated by said driving coil.

11. An optical disk recording and reading apparatus, comprising said lens actuator defined by any one of claims 1–10, wherein said object lens is to gather laser light on an optical disk.

* * * * *